(12) United States Patent
Graham et al.

(10) Patent No.: US 10,853,197 B2
(45) Date of Patent: Dec. 1, 2020

(54) DATA RECOVERY WITH AUTHENTICITY

(71) Applicant: HEWLETT-PACKARD DEVELOPMENT COMPANY, L.P., Houston, TX (US)

(72) Inventors: Christoph Graham, Houston, TX (US); Yongmei Hua, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 34 days.

(21) Appl. No.: 16/092,956

(22) PCT Filed: Jul. 29, 2016

(86) PCT No.: PCT/US2016/044653
§ 371 (c)(1),
(2) Date: Oct. 11, 2018

(87) PCT Pub. No.: WO2018/022082
PCT Pub. Date: Feb. 1, 2018

(65) Prior Publication Data
US 2019/0205219 A1    Jul. 4, 2019

(51) Int. Cl.
| | |
|---|---|
| *G06F 17/00* | (2019.01) |
| *G06F 11/14* | (2006.01) |
| *G06F 11/10* | (2006.01) |
| *G06F 21/00* | (2013.01) |
| *G06F 11/00* | (2006.01) |
| *G06F 16/13* | (2019.01) |
| *G06F 16/23* | (2019.01) |
| *G06F 21/64* | (2013.01) |

(52) U.S. Cl.
CPC .......... *G06F 11/1469* (2013.01); *G06F 11/00* (2013.01); *G06F 11/1004* (2013.01); *G06F 11/1076* (2013.01); *G06F 11/14* (2013.01); *G06F 16/137* (2019.01); *G06F 16/2365* (2019.01); *G06F 21/00* (2013.01); *G06F 21/64* (2013.01); *G06F 2201/80* (2013.01)

(58) Field of Classification Search
CPC ............ G06F 11/1469; G06F 11/1004; G06F 11/1076; G06F 11/16; G06F 11/31; G06F 11/14; G06F 11/00; G06F 21/00; G06F 21/64; G06F 16/137; G06F 16/2365; G06F 16/31; G06F 2201/80
See application file for complete search history.

(56) References Cited

U.S. PATENT DOCUMENTS

| | | | |
|---|---|---|---|
| 5,892,904 A | 4/1999 | Atkinson et al. | |
| 6,088,803 A | 7/2000 | Tso et al. | |
| 7,043,637 B2 * | 5/2006 | Bolosky | H04L 9/0656 |
| | | | 713/171 |
| 7,254,622 B2 | 8/2007 | Nomura et al. | |

(Continued)

*Primary Examiner* — Greta L Robinson
(74) *Attorney, Agent, or Firm* — Brooks Cameron & Huebsch PLLC (57) ABSTRACT

Example implementations relate to data recovery. An example controller can deliver file contents to a user, validate the file contents in real-time during the delivery, and in response to a determination that a portion of the file contents is broken, use the validated file contents to recover the broken portion of the file contents. The example controller can also deliver the recovered portion of the file contents to the user.

15 Claims, 5 Drawing Sheets

(56) References Cited

U.S. PATENT DOCUMENTS

| | | |
|---|---|---|
| 7,536,725 B2 | 5/2009 | Raciborski |
| 7,779,128 B2 * | 8/2010 | Utard .................. G06F 11/1076 370/256 |
| 7,870,608 B2 | 1/2011 | Shraim et al. |
| 7,882,351 B2 | 2/2011 | Serret-Avila et al. |
| 8,032,758 B2 | 10/2011 | Tian |
| 8,839,431 B2 | 9/2014 | Bennett |
| 2007/0233891 A1 | 10/2007 | Luby et al. |
| 2009/0125773 A1 | 5/2009 | Lee et al. |
| 2010/0180291 A1 | 7/2010 | Kahn et al. |
| 2011/0055161 A1 | 3/2011 | Wolfe |
| 2011/0231645 A1 | 9/2011 | Thomas et al. |
| 2011/0246765 A1 * | 10/2011 | Schibuk .............. H04L 63/0823 713/158 |
| 2014/0181041 A1 * | 6/2014 | Whitehead .......... G06F 11/1469 707/652 |
| 2014/0181051 A1 * | 6/2014 | Montulli ............. G06F 11/1464 707/679 |
| 2014/0325265 A1 | 10/2014 | Sun et al. |
| 2015/0254020 A1 | 9/2015 | Taylor et al. |

\* cited by examiner

DATA RECOVERY WITH AUTHENTICITY

BACKGROUND

Data recovery is a process of salvaging inaccessible data from corrupted or damaged secondary storage, removable media or files, when the data they store cannot be accessed in a normal way. The data is most often salvaged from storage media such as internal or external hard disk drives (HDDs), solid-state drives (SSDs), USB flash drives, magnetic tapes, CDs, DVDs, RAID subsystems, and other electronic devices. Recovery may be implemented due to physical damage to the storage device or logical damage to the file system that prevents it from being mounted by the host operating system (OS).

DETAILED DESCRIPTION

Attesting to the identity and authenticity of content has become more important and prevalent as the number of internet users increases. For example, anonymous and malicious actors may actively engage users through phishing, human engineering, and/or other forms of subversion to subvert legitimate content with fraudulent and malicious contents. Systems exist to test the authenticity of content such as public key signing, code signing, etc.; however, these systems have not grown and adapted as file formats and transmission costs have increased.

For example, some approaches to data recovery with authenticity and/or data validation/authentication rely on the entirety of file contents to be available to attest authenticity and are designed to test a limited set of file formats. In contrast, examples of the present disclosure provide an ability to test for authenticity early in the data retrieval process, reducing costs of retrieval for fraudulent data. Furthermore, examples of the present disclosure may present a data recoverability component that can be measured and monitored in real-time during data transfer and can mitigate costs associated with data retransmission. For instance, examples of the present disclosure may allow for data recovery such that a block of broken content can be replaced and/or repaired with a block of recovery content.

In addition, some approaches to data recovery with authenticity and/or data validation/authentication include using only Reed-Solomon codes, erasure code systems, cyclical-redundancy or other in-line recovery protocols, and/or code signing. However, these approaches include multiple costs including time, CPU utilization, network bandwidth utilization, network data transmission costs, and other opportunity costs. Additionally, these approaches include increasing costs and lengths of time to implement file signing schemes, and they may be limited to signing only some file types (e.g., executable file types). In addition, these approaches may require recovery data carried along with original data in a same packet (e.g., network packet). Further, these approaches may not assess and react to threats quick enough to avoid an attack or infection of their environment. For instance, these approaches may be unable to authenticate and/or validate date until all of the file contents have been delivered (e.g., downloaded), resulting in costs incurred from the entire delivery.

Furthermore, some approaches may result in increased costs to implement file signing schemes for large content. For instance, file signing may be done through a centralized authority to limit fraudulent signing or apply consistent processes (e.g., antivirus scanning) such as at an organizational level. In such an organizational level example, a company may have one identity for code signing that is shared as a resource to all potential signers. The process of signing in this model can be expensive due to network transmission and delays because the time to sign contents not only increases due to the size of contents to be signed and the strength (e.g., size) of the keys used to sign that content. For instance, as the size of an operating system grows, so does the process of signing binaries associated with the operating system.

In contrast, examples of the present disclosure can provide a safeguard resulting in accurate, authentic, and trustworthy file contents while the file contents are being downloaded. To address the threat of fraudulent data on the internet, examples of the present disclosure allow for an assessment and reaction to the threat, during delivery of file content. In addition, examples of the present disclosure do not embed the costs of recovery into the transmission of data, resulting in the costs of transmission being accrued only as needed. Further, examples of the present disclosure can provide attestation and authenticity to large file contents before an end user must download and potentially expose themselves to risks. For instance, examples of the present disclosure can validate file integrity and authenticity in real-time as file contents are being delivered to a user. In addition, examples of the present disclosure can allow for a user to begin using file contents prior to all of the file contents being available (e.g., before completion of delivery and/or download). Similarly, examples of the present disclosure can allow for a process to being using the file contents immediately upon validation and/or authorization, which can speed up further processing for a user.

Figure 1:
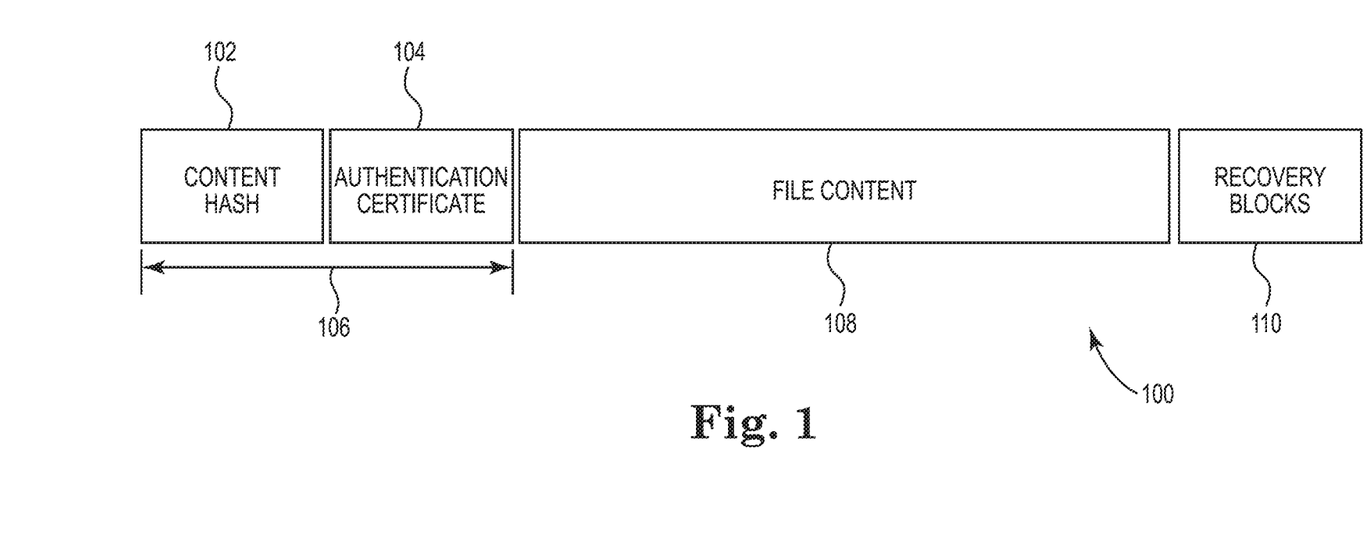
FIG. 1 illustrates a diagram of a file-based format according to an example.

FIG. 1 illustrates a diagram 100 of a file-based format according to an example. The file-based format can represent an entire file size. For instance, the file-based format can be a per-sector representation of an entire disk structure (e.g., an entire International Organization for Standardization (ISO) image, DVD ROM representation, hard drive image, etc.). Such a file-based format can provide a mechanism to validate file integrity and authenticity by validating file contents in real-time as the file contents are being delivered to a user and/or service. In such an example, a user may be able to choose to opt-out of the delivery (e.g., data transmission, download, etc.) at any point during delivery. For instance, a user can opt-out if they are suspicious that the file content is not authentic, has been tampered with, and/or contains too many errors to be reliable.

Diagram 100 includes file content 108. File content 108 can include an item delivered to a user. For instance, a large image representing a hard drive of a platform may be delivered to a user. This item may include a large image (e.g., up to 10 Gigabytes) offered for download, for example. Such an item may include a number of individual files.

Diagram 100 also includes content hash portion 102 (also known as hash keys for parity data), authentication certificate portion 104 (also known as signatures over the hash key data), and recovery blocks 110. Content hash portion 102 and authentication certificate portion 104 can be included in hash content area 106. Hash content area can also include file content location information, file content hash information, and portions of the file content structure representation information.

The file contents can be measured in hash blocks in the content hash portion 102. The hash block sizes can be defined, and it may be desired that the hash blocks be relatively small compared to other hash blocks, such that they are quicker to measure, easier to download, and/or easier to recover. The file contents, as noted, can be measured in a block size and stored as individual hash blocks within content hash portion 102. This measurement can be performed using a one-way function to calculate a value associated with each block, for example, and that value can be used in a determination of the quality and/or completeness of the file content in the hash block.

The hash blocks, which can also include recovery content, can represent the file contents, and a secure attestation can be made on that representation. As such, once the hash blocks are ready, they can be relied upon for validation and authentication. For instance, because the hash blocks are reliable, if a piece of material in the file content is later changed, the hash will break, so the initial file content can be retrieved and the file contents' integrity analyzed and validated.

Authentication certificate portion 104 can include authentication certificates (e.g., signing certificates, digital signatures, etc.) associated with each hash block within content hash portion 102. Both content hash portion 102 and authentication certificate portion 104 can have sizes governed by the number of hash blocks being signed/authenticated. As such, the scale of the sizes of portions 102, 104, 108, and 110 can vary; for instance, the sizes of content hash portion 102 and authentication certification portion 104 can be smaller or larger as compared to file content portion 108 than shown in FIG. 1. In some examples, a user may be able to maintain and obtain the information present in the hash content area 106, and this information can be used in an evaluation process of the file contents' validity and/or authenticity.

Recovery blocks portion 110 can include recovery blocks used to repair and/or replace broken file content. For instance, a hash of each recovery block may be found in the content hash portion 102, but the recovery blocks may be generated using Reed-Solomon code. The recovery blocks contain recovery data used to repair and/or replace broken file content, but do not contain hashes.

Figure 2:
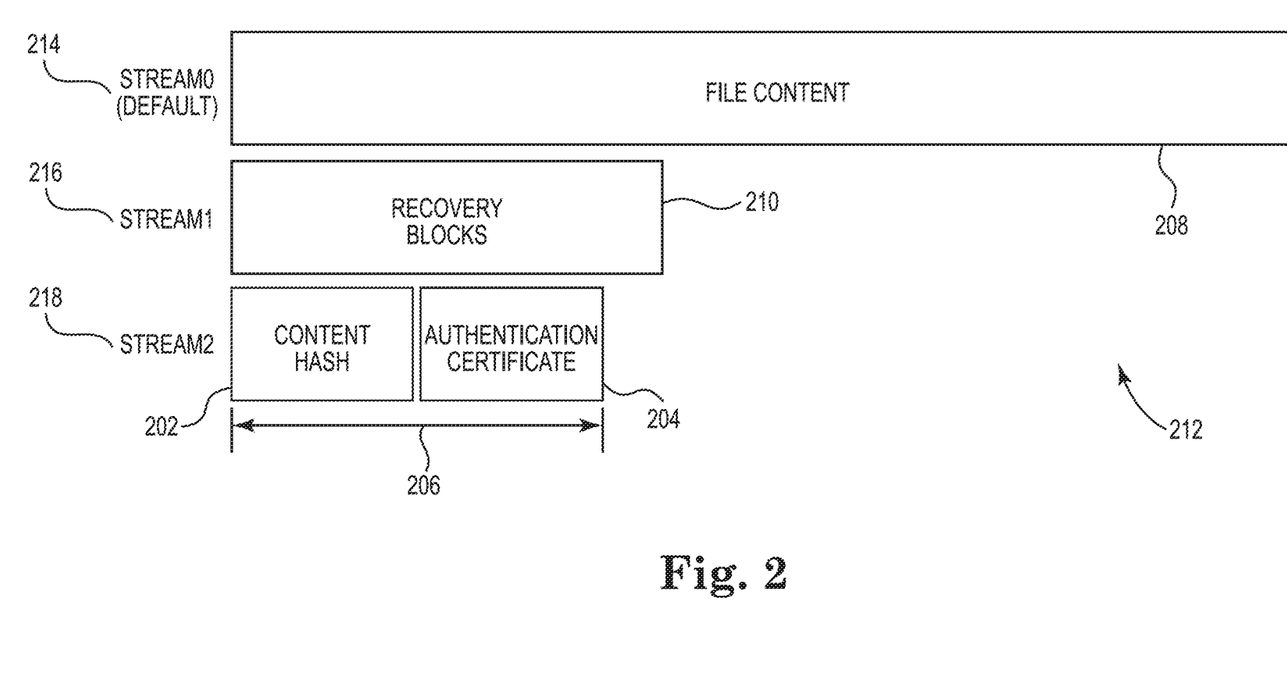
FIG. 2 illustrates a diagram of a data stream format according to an example.

FIG. 2 illustrates a diagram 212 of a data stream format according to an example. For instance, diagram 212 uses a data stream format and/or a file system metadata format to represent similar examples to those illustrated in FIG. 1. The data stream format may be an alternative data stream format, which may allow for the forking of file data into existing files without affecting their functionality, size, or display. Additional streams may be added for additional attributes of data and maintained at a file system level. In such an example, the content portion 208, recovery blocks portion 210 and hash content area 206 can be applied to individual data streams within a file system that supports data streams.

With respect to a file system metadata format, a file system can store the metadata associated with the file content including a file name, a length of the contents of a file, and/or a location of the tale in the folder hierarchy, separate from the contents of the file.

In the example illustrated in FIG. 2, the stream0 214, stream1 216, and stream1 218 can represent a sequence of bytes, can include data written to a file, and can give additional information about a file than attributes and properties. Each data stream can maintain its own state for compression, encryption, and sparseness. For example, data stream0 214 (also called default stream) includes file content 208. File content 208 can include information delivered (or to be delivered) to a user (e.g., downloadable content). Data stream1 216 can include recovery blocks 210 as described with respect to recovery blocks 110 of FIG. 1, and data stream2 218 can include hash content area 206, which can include content hash portion 202 and authentication certification portion 204 as described in FIG. 1 with respect to hash content area 106, content hash portion 102 and authentication certification portion 104.

Though not illustrated in FIGS. 1 and 2, content hash portion 102, 202, recovery blocks portion 110, 210, and file content portion 108, 208, can include individual blocks of data. For instance, content hash portion 102, 202 can include hash blocks, file content portion 108, 208 can include content blocks, and recovery blocks portion 110, 210 can include recovery blocks. The different blocks may have different sizes and relationships with respect to one another.

For instance, the hash blocks may be small in size (e.g., 128 bytes), but may map 1:1 to the content blocks. Content blocks may be the largest of the blocks (e.g., 1 megabyte), but as noted, may map 1:1 to the hash blocks. The recovery block sizes may be determined by the amount of data to be recovered (e.g., 5-10 kilobytes), The number of recovery blocks can be based on the number of content blocks.

In some examples, a source can deliver file contents to a user (e.g., via download). For instance, a user may request to download particular file contents, or a source may push the file contents to the user. The user may not be able to determine the authenticity of the source (e.g., whether the file contents are coming from who the user thinks they are), and/or the user may not be able to determine an integrity of the file contents (e.g., whether or not they are corrupt, broken, etc.). In such an example, the authenticity and integrity of the file contents 108, 208 can be validated using hash content area 106, 206.

For instance, file content 108, 208 can be measured in hash blocks and kept as individual hash blocks within content hash portion 102, 202. An authentication certificate associated with each of the hash blocks can be stored in authentication certification portion 104, 204. A one-way function can be used to calculate a value associated with each of the individual hash blocks, which can verify the completeness and quality of the file content hash blocks within content hash portion 102, 202. With these hash blocks now representing the entire file content 108, 208, the file content 108, 208 can be delivered to a user.

As the file contents 108, 208 are delivered to the user, the source of the the contents 108, 208 can be authenticated at any time during the delivery process using authentication certificate portion 104, 204. For instance, the identity of the source of the file contents 108, 208 can be tested and validated during delivery through a comparison to the contents of authentication certificate portion 104, 204. Should the validity of the source come into question, the delivery can be stopped at any time. For instance, if a user becomes suspicious, the user can opt-out of the delivery without having to complete the entire delivery (e.g., wait for a complete download).

Similarly, as the file contents 108, 208 are delivered to the user, the integrity of the file contents 108, 208 can be analyzed using content hash portion 102, 202. For instance, if during the analysis of the integrity, it is determined that the file contents 108, 208 have been tampered with, are corrupt, are broken, etc., the delivery of file contents 108, 208 can be stopped. In some examples, a user may opt out of the delivery at any time during delivery if such a determination is made, rather than waiting for delivery completion.

In some examples, if a determination is made using the contents of content hash portion 102, 202 that file contents 108, 208 are damaged, corrupt, tampered with, etc., those file contents 108, 208 can be recovered and/or repaired during delivery. For instance, if one block of file content 108, 208 is damaged, one recovery block from recovery block portion 110, 210 can be used to recover and/or repair the damaged block during delivery. Similarly, if two blocks are damaged, two recovery blocks can be used to repair and/or recovery the damaged blocks during delivery. That is, for every one piece of damaged file content, one recovery block can be used to recover and/or repair. This can reduce the amount of recovery data needed for repair, thus reducing costs and time needed. Further, in some examples, any recovery block within recovery block portion 110, 210 can be used to repair any block of damaged, lost, broken, etc. the content.

In some examples, it may be known as the file contents 108, 208 are being delivered that a block of the file contents 108, 208 is corrupt or not corrupt. In such an example where a corrupt block is discovered, a new, non-corrupt block can be grabbed from content hash portion 102, 202 to provide recovery information for the corrupt block. Alternatively, a recovery block from recovery block portion 110, 210 can be grabbed to provide recovery information for the corrupt block. This can be done during delivery of the file contents 108, 208, which may ensure authenticity and integrity of the file contents 108, 208 before completion of delivery. For example, the hash blocks and/or the recovery blocks may be smaller than the original data blocks (e.g., file content blocks) for which they are providing recovery information (e.g., about 2-5 percent of the size). A recovery block—along with the corrupted data can be transformed/processed to recreate the original block. By using a Reed Solomon model to generate a recovery block, any recovery block can substitute for another block. All that may be needed is equal numbers of recovery blocks for equal parts (blocks) of corrupted data.

Figure 3:
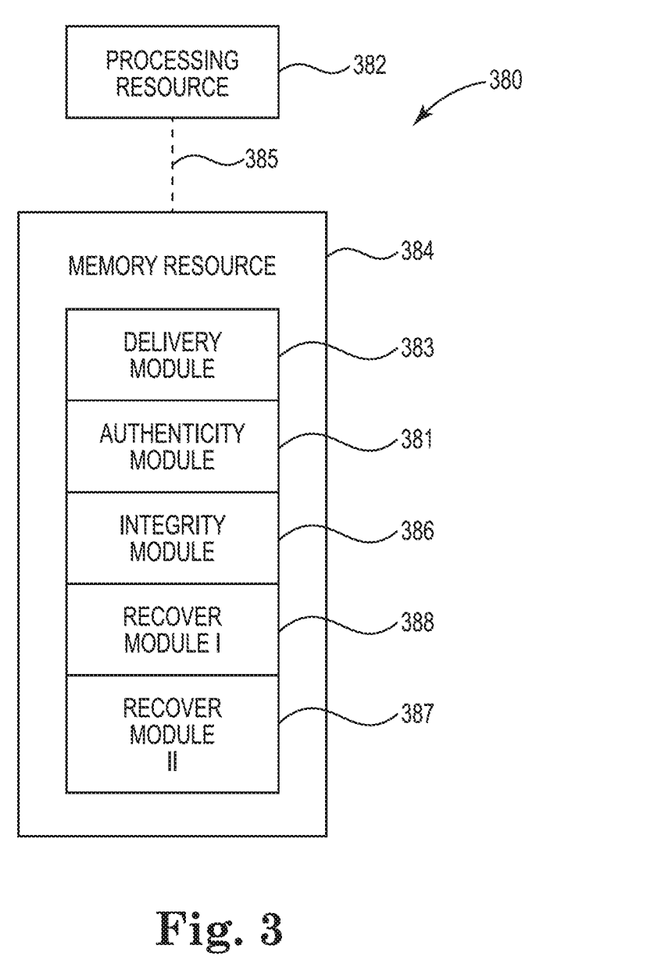
FIG. 3 illustrates a diagram of a computing system including a processing resource, a memory resource, and a number of modules according to an example.

FIG. 3 illustrates a diagram of a computing system 380 including a processing resource 382, a memory resource 384, and a number of modules 383, 381, 386, 388, 387 according to an example. The computing system 380 can utilize instructions (e.g., software and/or firmware) hardware, and/or logic to perform a number of functions including those described herein. The computing system 380 can be a combination of hardware and program instructions configured to share information. The hardware, for example, can include a processing resource 382 and/or a memory resource 384 (e.g., computer readable medium (CRM), machine readable medium (MRM), etc., database, etc.).

A processing resource 382, as used herein, can include a processor capable of executing instructions stored by a memory resource 384. Processing resource 382 can be implemented in a single device or distributed across multiple devices. The program instructions (e.g., machine-readable instructions (MRI)) can include instructions stored on the memory resource 384 and executable by the processing resource 382 to implement a desired function (e.g., data recovery, data validation, and/or data authentication).

The memory resource 384 can be in communication with a processing resource 382. A memory resource 384, as used herein, can include memory components capable of storing instructions that can be executed by processing resource 382. Such memory resource 384 can be a non-transitory CRM or MRM. Memory resource 384 can be integrated in a single device or distributed across multiple devices. Further, memory resource 384 can be fully or partially integrated in the same device as processing resource 382 or it can be separate but accessible to that device and processing resource 382. Thus, it is noted that the computing system 380 can be implemented on a participant device, on a server device, on a collection of server devices, and/or a combination of the user device and the server device.

The memory resource 384 can be in communication with the processing resource 382 via a communication link (e.g., a path) 385. The communication link 385 can be local or remote to a machine (e.g., a computing system) associated with the processing resource 382. Examples of a local communication link 385 can include an electronic bus internal to a machine (e.g., a computing system) where the memory resource 384 is one of volatile, non-volatile, fixed, and/or removable storage medium in communication with the processing resource 382 via the electronic bus.

A module and/or modules 383, 381, 386, 388, 387 can include MRI that when executed by the processing resource 382 can perform a number of functions including those described herein. The number of modules 383, 381, 386, 388, 387 can be sub-modules of other modules. For example, the recover module I 388 and the recover module II 387 can be sub-modules and/or contained within the same computing system. In another example, the number of modules 383, 381, 386, 388, 387 can comprise individual modules at separate and distinct locations (e.g., MRM, etc.).

Each of the number of modules 383, 381, 386, 388, 387 can include instructions that when executed by the processing resource 382 can function as a corresponding engine. For example, the delivery module 383 can include instructions that when executed by the processing resource 382 can function as a delivery engine. Similar, each of the number of modules 383, 381, 386, 388, 387 can include instructions that when executed by the processing resource 382 can function as engines.

In some examples, engines can be part of a system (not illustrated) including a database, a subsystem, and the number of engines. The subsystem can include the number of engines in communication with the database via a communication link (e.g., link 385 as referenced in FIG. 3). The system can represent instructions and/or hardware of a network controller (e.g., system 380 as referenced in FIG. 3, etc.).

The number of engines can include a combination of hardware and programming to perform functions including those described herein. The instructions can include instructions (e.g., software, firmware, etc.) stored in a memory resource (e.g., CRM, MRM, etc.) as well as hard-wired program (e.g., logic).

In some examples, the number of modules 383, 381, 386, 388, 387 can be used in a software-as-a-service delivery model. For instance, components of computing system 380 can exist in a single computing system or multiple computing systems (e.g., distributed). For example, a web server or other computing system that is trusted by the user can provide services to a server of individual data streams, and/or act on behalf of the user as a processing agent for recovery.

In an example, delivery module 383 can include instructions that when executed by the processing resource 382 can cause a computing system to deliver file contents to a user. For instance, an image representing an entire hard drive of a platform may be sent to a user. The user may request delivery in the form of a download or other delivery method, and/or the source of the file contents can push the delivery to the user. In some examples, the instructions can be further executable to deliver the file contents to a user within a same network as a source of the file contents. For instance, systems within a network can be in communication with one another and can delivery file contents to one another. Some examples may leverage access to content ranges instead of always starting at the beginning of file content, which can result in increased recoverability for network usage.

Authenticity module 381 can include instructions that when executed by the processing resource 382 can cause a computing system to validate an authenticity of the file contents in real-time during the delivery. Validating the authenticity of the file contents can include validating authenticity of remote content before the actual file contents are downloaded. This can allow for the testing and validation of the identity of the file content source, and at any point during delivery, the source of the file contents can be determined.

In some examples, validation may be desired because during delivery of the file contents (e.g., the image mentioned above), the source of the file contents may be unclear, meaning the source is unknown and/or the identity of the source has been tampered with. Validation may also be desired, because even with an authentication certificate (e.g., a signature), there may not be a guarantee that the authentication certificate follows the image and/or that the authentication certificate has not been replaced. Further, in an example within a network, in an environment where data is moving from hard disk to hard disk and/or inside a network, data can be broken, lost, etc. within the file contents, so validation of the authenticity of the source of the file contents can be performed.

Integrity module 386 can include instructions that when executed by the processing resource 382 can cause a computing system to analyze an integrity of the file contents in real-time during the delivery. Analysis of the integrity of the file contents can include determining if any of the file contents is broken, lost, corrupt, tampered with, etc. Analysis of the integrity of the file contents may be desired because during delivery of the file contents (e.g., the image mentioned above), a connection may be lost, and/or the file contents may be corrupt, among other issues as noted above. At any point during delivery, a determination can be made that the file contents that have been download are correct or incorrect. Any one piece of broken file content can be replaced with any one piece of recovery content. This can be done during delivery, meaning a user does not have to wait for all of the file contents to download before determining a portion or all of the file contents are broken, incorrect, corrupt, etc.

Further, in an example within a network, in an environment where data is moving from hard disk to hard disk and/or inside a network, data can be broken, lost, etc. within the file contents, so analyzing an integrity of the file contents can be performed.

Recover module I 388 can include instructions that when executed by the processing resource 382 can cause a computing system to recover data to repair an authenticity issue determined during the authenticity validation. For instance, if a determination is made during delivery that an authentication certificate is invalid, that authentication certificate can be replaced with a new, valid authentication certificate based on contents of an authentication portion of a file system and/or a recovery block portion of the file system. The repair/replacement and/or recovery of the authentication certificate can be performed during delivery, in real-time, such that the user does not have to wait for completion of delivery. The user can know in real-time during delivery that the source of the file contents is authentic.

Recover module II 387 can include instructions that when executed by the processing resource 382 can cause a computing system to recover data to repair a file corruption issue determined during the analysis of the integrity of the file contents. For instance, data can be recovered to repair a file corruption issue by replacing a corrupt block with a recovery block. This can be performed in a one-to-one manner, such that any one block of broken file content can be repaired/replaced with one block of recovery data. This can result in having to recover the least amount of data as necessary being used to fixed corruption or other issues. For instance, in some examples, a failed hash block can be retransmitted individually once an error is found, which can correct transmission errors and/or I/O processing errors, Additionally or alternatively, a failed hash block can be recovered using one recovery block, correcting persistent errors in a source file.

In an example, computer system 380 can include a hash area module (not illustrated in FIG. 3) can include instructions that when executed by the processing resource 382 can cause a computing system to create a content hash area comprising a representation of the file contents, wherein the representation includes a secure attestation. For instance, the content hash area can include file content hash blocks and associated authentication certificates. These can represent the entire file contents, and a secure attestation can be made on those file contents, which can be used for authentication and validation of the file contents and their source.

Figure 4:
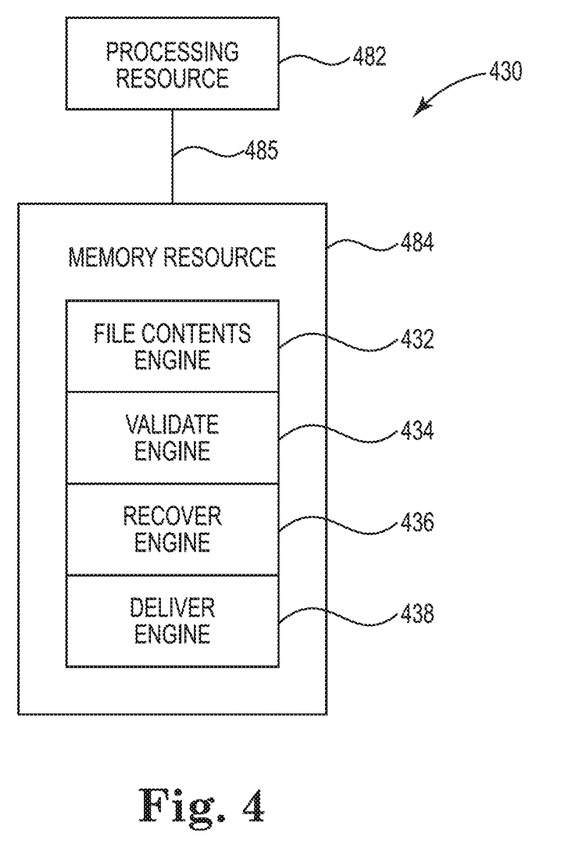
FIG. 4 illustrates a diagram of a controller including a processing resource, a memory resource, and a number of modules according to an example.

FIG. 4 illustrates a diagram of an example controller 430 including a processing resource, a memory resource, and a number of modules according to an example. For example, the controller 430 can be a combination of hardware and instructions for data recovery, data validation, and/or data authentication. The hardware, for example can include a processing resource 482 and/or a memory resource 484 (e.g., MRM, CRM, data store, etc.).

The processing resource 482, as used herein, can include a number of processors capable of executing instructions stored by a memory resource 484. The instructions (e.g., MRI) can include instructions stored on the memory resource 484 and executable by the processing resource 482 to implement a desired function (e.g., data recovery, data validation, and/or data authentication, etc.).

The memory resource 484, as used herein, can include a number of memory components capable of storing non-transitory instructions that can be executed by processing resource 482. Memory resource 332 can be integrated in a single device or distributed across multiple devices. Further, memory resource 332 can be fully or partially integrated in the same device as processing resource 330 or it can be separate but accessible to that device and processing resource 330. Thus, it is noted that the controller 430 can be implemented on an electronic device and/or a collection of electronic devices, among other possibilities.

The memory resource 484 can be in communication with the processing resource 482 via a communication link (e.g., path) 485. The communication link 485 can be local or remote to an electronic device associated with the processing resource 482.

The memory resource 484 includes a number of engines (e.g., file contents engine 432, validate engine 434, recover engine 436, deliver engine 438, etc.). The memory resource 484 can include additional or fewer engines than illustrated to perform the various functions described herein.

The number of engines can include a combination of hardware and instructions to perform a number of functions described herein (e.g., data recovery, data validation, and/or data authentication, etc.). The instructions (e.g., software, firmware, etc.) can be downloaded and stored in a memory resource (e.g., MRM) as well as a hard-wired program (e.g., logic), among other possibilities.

The file contents engine 432 can deliver file contents to a user, for instance via a download. This delivery can take place inside or outside of a network setting. The validate engine 434 can validate the file contents in real-time during the delivery. For instance, the validation can include the controller 430 validating an authenticity of the file contents and an authenticity of hash blocks within a hash content area associated with the file contents in real-time before completion of the delivery. Additionally or alternatively, the validation can include the controller 430 analyzing an integrity of the file contents and an authenticity of hash blocks within a hash content area associated with the file contents in real-time before completion of the delivery. For instance, validated file contents can include file contents with an authenticated source, and file contents that are not corrupt, broken, lost, etc.

The recover engine 436 can use the validated file contents to recover the broken portion of the file contents in response to a determination that a portion of the file contents is broken. In some examples, recovering the broken portion can include the controller 430 redelivering the broken portion. Recovering the broken portion in some examples can also include the controller 430 replacing the broken portion with a recovery portion. For instance, a block of broken file content may be replaced with a block of recovery portion. This can be performed during delivery of the file contents.

The deliver engine 438 can deliver the recovered portion of the file contents to the user. For instance, the recovered portion can be delivered in real-time, during delivery to the user. The user does not have to wait for completion of delivery to receive the recovered portion. Further, the user does not have to wait for completion of delivery to learn that the file contents source is not authentic (e.g., not who they though was sending the file contents) and/or that the file contents are broken, corrupt, lost, etc. This can save the user time, costs, and concerns.

In some examples, the controller 430 can include instructions to allow the user to begin using the file contents before completion of the delivery (e.g., while delivery of the file contents are underway). For instance, all of the file contents may not be available to the user, but the portions that are available can be used. The available the contents may be validated and authenticated, so the user can safely use the available file contents.

In some examples, the controller 430 can allow a process to start using file contents before delivery is complete. For instance, the file contents can include an ISO image or a group of files (e.g., zip or other file archive format) such that once individual files in the underlying format are available, they have be authenticated and validated (e.g., unaltered, legitimate), so a further process can start using that content (e.g., mounting a file system stored within the ISO or zip content). This can speed up further processing for the user, in some examples.

Figure 5:
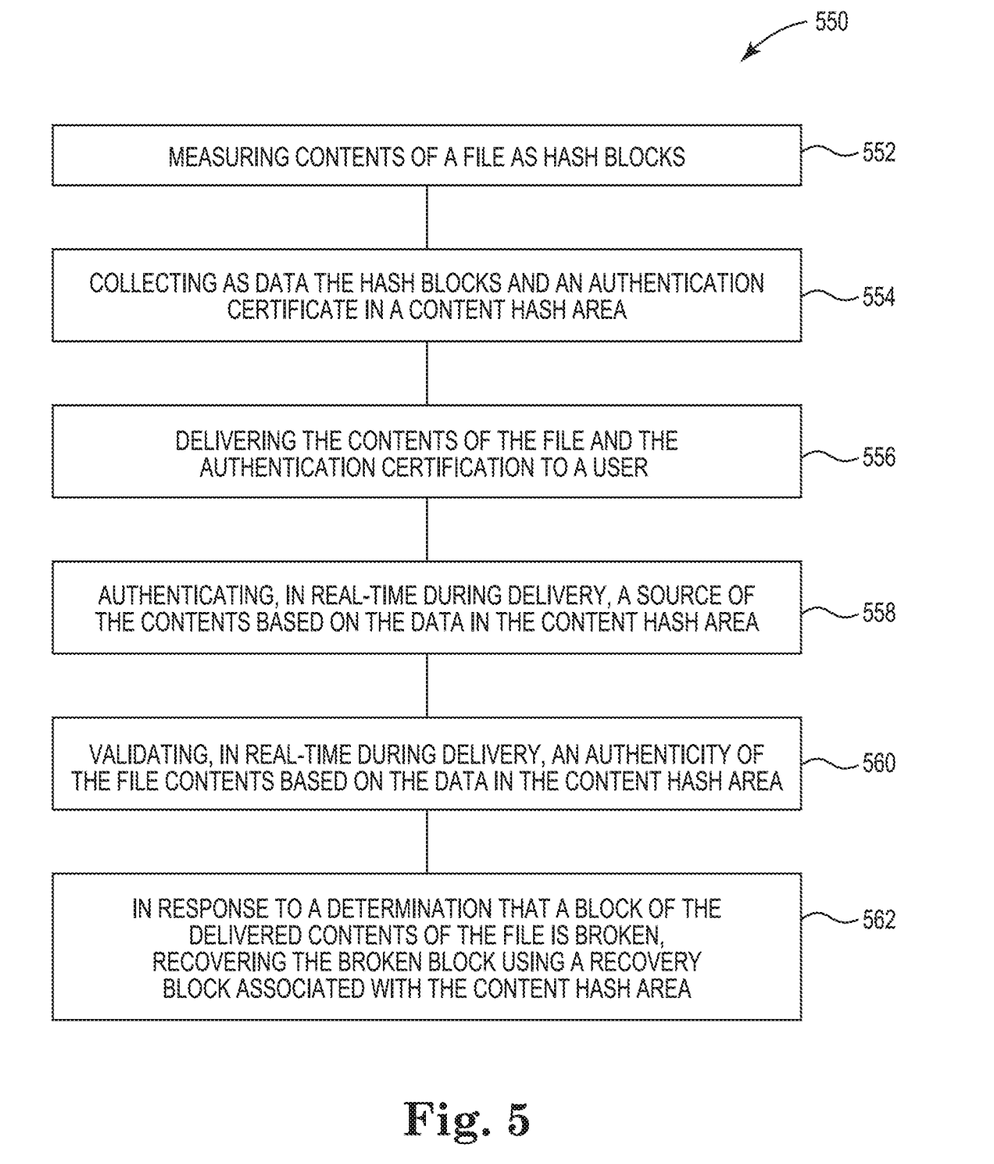
FIG. 5 illustrates a diagram of a method for data recovery with authenticity according to an example.

FIG. 5 illustrates a diagram of a method 550 for data recovery with authenticity according to an example. At 552, method 550 can include measuring contents of a file as hash blocks. A one way function can be used to calculate a value associated with each hash block, and that value can be used to determine a completeness and quality of the file content hash block. At 554, method 550 can include collecting as data the hash blocks and an authentication certificate in a content hash area. Method 550 can also include collecting as data a location of contents of the file and a file structure represented as contents of the file in the content hash area. The information within the content hash area can be used to validate an integrity of the file contents and authenticate a source of the file contents, as will be discussed further herein.

Method 550, at 556 can include delivering the contents of the file and the authentication certification to a user. The contents of the file can be delivered via download, for instance, and can be delivered in-network, out-of-network, or both. At 558, method 550 can include authenticating, in real-time during delivery, a source of the contents based on the data in the content hash area. For instance, using authentication certificate information within the content hash area, the authenticity of the source can be determined. If suspicions arise with respect to the authenticity of the source (e.g., a certificate has been tampered with, removed, etc.), delivery can stop, or the authentication certificate can be repaired and/or replaced during deliver and in real-time.

At 560, method 550 can include validating, in real-time during delivery, an authenticity of the file contents based on the data in the content hash area. For instance, using the hash blocks, a determination can be made as to whether the file contents are corrupt, broken, lost, etc. Method 550 can include, at 562, recovering the broken block using a recovery block associated with the content hash area in response to a determination that a block of the delivered contents of the file is broken. For instance, if a block is corrupt, broken, lost, etc., any recovery block can be used to repair/replace the broken block. The recovery block may be associated with the content hash area such that there is a hash of the recovery block in the content hash area. In some examples, recovering the broken block using a recovery block from the content hash area includes recovering a number of broken blocks using a same number of recovery blocks. For instance, if five blocks are broken, five recovery blocks can be used to recover the five broken blocks.

Method 550 can also include allowing a user to use a first portion of the contents of the file upon delivery completion of the first portion while delivery of a second portion of the contents of the file is still underway. For example, once a portion of the file contents is delivered, a user can begin using that portion before receiving the rest of the file contents. Method 550 can also include determining a size of the content hash area based on a number of the hash blocks within the content hash area associated with the authentication certificate. For instance, the content hash area size can vary and may be small relative to the actual file contents, allowing for a user to maintain and obtain information within the content hash area quickly. Further, with a smaller authentication certificate portion, the expense of signing and validating file contents can be reduced by using the smaller recovery has content as the source for signing material.

Method 550 can further include receiving instructions from a user to stop delivery of the file contents, and in response to receiving the instructions, ceasing delivery of the file contents. For instance, if it is determined that the source of the file contents is not authentic and/or that the integrity of the file contents is suspicious, a user can opt-out of the remainder of the delivery. This can save the user time and costs, as well as concern over having received unreliable file contents.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to one or more of such elements and/or features.

What is claimed:

1. A controller comprising a processing resource in communication with a memory resource including instructions executable to:
    deliver file contents to a user;
    validate an authenticity and an integrity of the file contents in real-time during the delivery using a hash content area;
    in response to a determination that a portion of the file contents is broken, use the validated file contents to recover the broken portion of the file contents and replace the broken portion with a recovery block; and
    deliver the recovered portion of the file contents to the user.

2. The controller of claim 1, wherein the instructions executable to validate the authenticity and the integrity of the file contents in real-time include instructions executable to validate the authenticity of the file contents and the authenticity of hash blocks within the hash content area associated with the file contents in real-time before completion of the delivery.

3. The controller of claim 1, wherein the instructions executable to validate the authenticity and the integrity of the file contents in real-time include instructions executable to analyze the integrity of the file contents and the authenticity of hash blocks within the hash content area associated with the file contents in real-time before completion of the delivery.

4. The controller of claim 1, wherein the instructions executable to recover the broken portion of the file contents comprise instructions executable to redeliver the broken portion.

5. The controller of claim 1, wherein the instructions executable to recover the broken portion of the file contents comprise instructions executable to replace the broken portion with the recovery portion block from the hash content area that includes the validated file contents and authenticated hash blocks.

6. A method, comprising:
    measuring contents of a file as hash blocks;
    collecting as data the hash blocks and an authentication certificate in a content hash area;
    delivering the contents of the file and the authentication certification to a user;
    authenticating, in real-time during delivery, a source of the contents based on the data in the content hash area;
    validating, in real-time during delivery, an authenticity and an integrity of the file contents based on the data in the content hash area; and
    in response to a determination that a block of the delivered contents of the file is broken, recovering the broken block using a recovery block associated with the content hash area that includes the validated file contents and authenticated hash blocks.

7. The method of claim 6, further comprising allowing a user to use a first portion of the contents of the file upon delivery completion of the first portion while delivery of a second portion of the contents of the file is still underway.

8. The method of claim 6, further comprising collecting as data a location of contents of the file and a file structure represented as contents of the file in the content hash area.

9. The method of claim 6, further comprising determining a size of the content hash area based on a number of the hash blocks within the content hash area associated with the authentication certificate.

10. The method of claim 6, further comprising:
    receiving instructions from a user to stop delivery of the file contents; and
    in response to receiving the instructions, ceasing delivery of the file contents.

11. The method of claim 6, wherein recovering the broken block using the recovery block associated with the content hash area includes recovering a number of broken blocks using a same number of recovery blocks.

12. A non-transitory machine-readable medium storing instructions executable by a processing resource to cause a computing system to:
    deliver file contents to a user;
    validate an authenticity of the file contents in real-time during the delivery using a content hash area;
    analyze an integrity of the file contents in real-time during the delivery;
    recover data to repair an authenticity issue, using a first recovery block, determined during the authenticity validation; and
    recover data to repair a file corruption issue, using a second recovery block, determined during the analysis of the integrity of the file contents.

13. The non-transitory machine-readable medium of claim 12, further comprising instructions executable by the processing resource to cause the computing system to create the content hash area comprising a representation of the file contents, wherein the representation includes a secure attestation.

14. The non-transitory machine-readable medium of claim 12, wherein the instructions are further executable to deliver the file contents to a user within a same network as a source of the file contents.

15. The non-transitory machine-readable medium of claim 12, wherein the instructions are further executable to recover data to repair the file corruption issue by replacing a corrupt block with the second recovery block.

* * * * *